United States Patent

[11] 3,614,601

| [72] | Inventors | Edward A. Heckman<br>Allentown;<br>James O. Hinkle, Emmaus; Edgar H. Walls, Allentown, all of Pa. |
|---|---|---|
| [21] | Appl. No. | 818,938 |
| [22] | Filed | Apr. 24, 1969 |
| [45] | Patented | Oct. 19, 1971 |
| [73] | Assignees | Western Electric Company, Incorporated<br>New York, N.Y. |

[54] APPARATUS FOR GAGING THE LOCATION OF CONTACT POINTS OF SWITCH-COVER ASSEMBLIES
6 Claims, 4 Drawing Figs.

[52] U.S. Cl. .................................................. 324/28 R,
  340/265
[51] Int. Cl. .................................................. G01r 31/02
[50] Field of Search............................................ 324/28,
  158, 51; 33/174 L, 143 L, ; 209/80, 81; 340/265

[56] References Cited
UNITED STATES PATENTS

| 2,569,433 | 9/1951 | Highberg et al. | 340/265 X |
| 3,506,911 | 4/1970 | Stone | 324/28 |
| 2,728,994 | 1/1956 | McCarthy | 33/174 L |
| 2,918,648 | 12/1959 | Ludman et al. | 324/158 F |
| 3,235,797 | 2/1966 | Boscia et al. | 324/158 F |
| 3,354,394 | 11/1967 | James | 324/158 |

*Primary Examiner*—Rudolph V. Rolinec
*Assistant Examiner*—R. J. Corcoran
*Attorneys*—H. J. Winegar, R. P. Miller and R. Y. Peters ABSTRACT: Contact pads of a conductive material are deposited on an insulating substrate by thin-film techniques. The contact pads are of such a size and in such a position as to define the limits of operation of contact points of a multislide switch. An apparatus utilizing the substrate and contact pads reveals those slide switches whose contact points fall within and without desired limits.

PATENTED OCT 19 1971 3,614,601

INVENTORS
E.A. HECKMAN
J.O. HINKLE
E.H. WALLS

BY R.Y. Peters
ATTORNEY

APPARATUS FOR GAGING THE LOCATION OF CONTACT POINTS OF SWITCH-COVER ASSEMBLIES

BACKGROUND OF THE INVENTION

This invention relates to gaging the location of contact points of switch-cover assemblies and, more particularly, to "Go-Not Go" gaging to determine whether the location of the contact points of slide switches of switch-cover assemblies are within predetermined limits of operation to satisfy the requirements of a thin-film resistor attentuator.

Typically, an attenuator includes a plurality of thin-film resistor networks on a ceramic support and a plurality of slide switches mounted in a cover which is superimposed over the ceramic support and networks thereon. Contact points on the slide switches engage conductive areas connected to the networks. When in one position, the contact points engage areas which connect networks of resistors into an electrical circuit and, when in a second position, the contact points engage other areas which bypass the circuit around the resistor networks. Each attenuator switch can either add zero or a fixed amount of resistance into the circuit and, therefore, the total resistance of the attenuator can be varied in predetermined steps from zero to the limit of the attenuator design. Attenuators of the proper design permit insertion of some energy loss into the voice frequency path of telephone circuits. In this way, the signal levels of the voice paths can be made the same to minimize or eliminate crosstalk without introducing distortion.

The conductive areas or elements of the thin-film networks, within which the contact points must fall in order to connect resistors into the circuits or bypass the circuits around the resistors, are of the order of 0.007 of a square inch each. Since each slide switch is controlled and guided by the cover and guide cavities therein, both the intentional and unintentional variations in the dimensions of the cavities and slide switch bodies, and the relation of the contact points to the switch bodies, effect the location of the contact points with respect to the thin-film network and thereby the operation of the attenuator.

The proper operation of the slide switch-cover assemblies would be assured, using prior art methods, by: gaging the size and location of cavities in the cover with respect to some reference surface or surfaces; gaging the size of the slide-switch bodies which fit the cavities and, finally, gaging the position of the contact points with respect to the slide-switch bodies that fit the cavities. In addition, to assure proper operation of the slide switches by gaging individual parts, clearances and tolerances would be kept small so that under the worst accumulation of tolerances the assembly would still function properly. Gaging individual parts has a number of significant disadvantages. Such gaging is time consuming to perform all the individual gaging operations. Also, it is expensive to provide the numerous gages required and uneconomical to discard individual parts because they do not meet the tight tolerances required.

SUMMARY OF THE INVENTION

Accordingly, it is an object of this invention to provide a new and improved apparatus for gaging the location of contact points of switch assemblies.

Another object is to provide more efficient and less costly apparatus for gaging the location of contact points of multislide switches notwithstanding the cumulative or compensating effect of a plurality of tolerances.

The foregoing and other objects of the invention are accomplished by providing apparatus for "Go-Not Go" gaging the location of the contact points of a slide switch-cover assembly having an array of contact pads which define the location and limits of operation of the contact points.

The contact pads are formed by thin-film techniques on an insulating substrate so that they are very precise in size and location with respect to reference pins, and are connected to a source of electrical energy in series with indicator lamps. When the slide switch-cover assembly is placed in the gaging apparatus with the contact points bearing against the insulating substrate and a slide switch placed in either of two operating positions, lamps light to indicate that the contact points have fallen within limits which assure proper operation of the switch-cover assembly. The apparatus has the distinct advantage of determining whether the parts cooperate correctly despite the cumulative or the compensating effect of all variations of the parts. Such a gaging apparatus has the additional advantage of being fast and, therefore, very economical. It also eliminates expenditures for many individual gages.

DESCRIPTION OF THE PREFERRED EMBODIMENT

The invention will be described in connection with the specific attenuator shown in FIG. 1 for purposes of illustration. However, it is to be noted that the invention applies to other such attenuators equally as well.

The construction and operation of the attenuator 21 will first be described with reference to FIG. 1 and the invention will be described with reference to FIGS. 2 through 4.

ATTENUATOR CONSTRUCTION AND OPERATION

Figure 1:
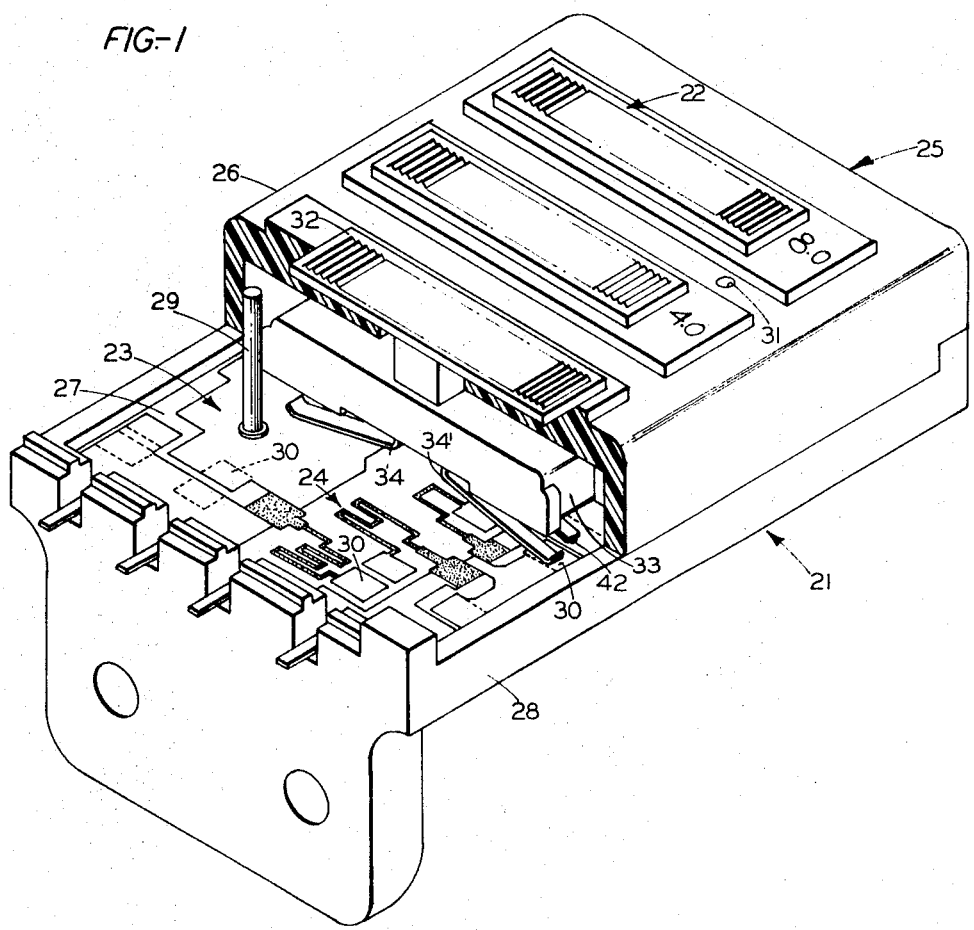
FIG. 1 is an isometric view, partially cut away, showing the construction of an attenuator having a switch-cover assembly.

Referring to FIG. 1, the attenuator 21 is an adjustable device for introducing an energy loss into voice-frequency paths of telephone circuits. Four slide switches 22 make direct contact to conductive films 23—23 (only portions of which are shown) within elements or areas 30—30 which are connected to thin-film resistor networks 24—24. Each switch 22 can insert a fixed amount of resistance, i.e., loss, into a voice-frequency path to which the attenuator is connected. The four switches 22 control losses forming a binary series. In one attenuator the series is 1.0, 2.0, 4.0 and 8.0 db. so that the loss of an attenuator 21 can be varied from 0 to 15 db. in steps of 1 db. In another, the series starts with 0.1 db. and ends with 0.8 db. so that the loss of an attenuator can be varied from 0 to 1.5 db. in steps of 0.1 db. The combination of the two attenuators provides an energy loss from 0 db. to 16.5 db. in steps of 0.1 db. For further information relative to attenuators, reference may be made to the article by L. A. Priolo and W. B. Reichard, "Thin-Film Technology Enters a New Era," The Western Electric ENGINEER, Dec. 1967, pages 49 and 50.

The four switches 22—22 are mounted in and retained by cavities in a plastic cover 26 to form a slide switch-cover assembly 25. The thin-film resistor networks 24—24, which are formed on a ceramic support 27 by thin-film techniques known in the art, are retained in a housing 28 to which the assembly 25 is secured. The two locating pins 29—29, one of which is shown, are precisely located with respect to the contact areas 30—30, and fastened to portions of the conductive film 23—23. Two corresponding locating holes 31—31 (only one of which is shown) in the cover 26 are precisely positioned with respect to the cavities. The holes 31—31 cooperate with the pins 29—29 to locate the slide switch-cover assembly 25 properly with respect to the areas 30—30.

Each slide switch 22 includes a plastic body 33, to which is fastened a serrated top 32 and two bifurcated conductive spring contacts 34 and 34'. Each bifurcation of the spring contact 34 is electrically connected to the other and terminates in a contact point 42. The same is true of the spring contact 34'.

Also, the spring contact 34 is electrically insulated from the spring contact 34'. The slide switches 22—22 may be placed in an end position either all the way to the right or all the way to the left. In each position, the contact points 42—42 must contact the conductive films 23—23 within the limits of the areas 30—30 which are very small, approximately 0.070 of an inch by 0.100 of an inch. The slide switch-cover assembly 25 must therefore be gaged to determine whether or not the contact points 42—42 fall within the limits of areas 30—30 and this may be done most advantageously by this invention.

THE INVENTION—CONSTRUCTION

The manifold difficulties which make it impractical, if not impossible, to gage individual elements and arrive at useful and reliable results by prior art methods and apparatus, are avoided in accordance with this invention by providing a single electromechanical gaging apparatus to obtain a reliable and useful indication of whether an attenuator slide switch-cover assembly 25 is satisfactory.

Figure 2:
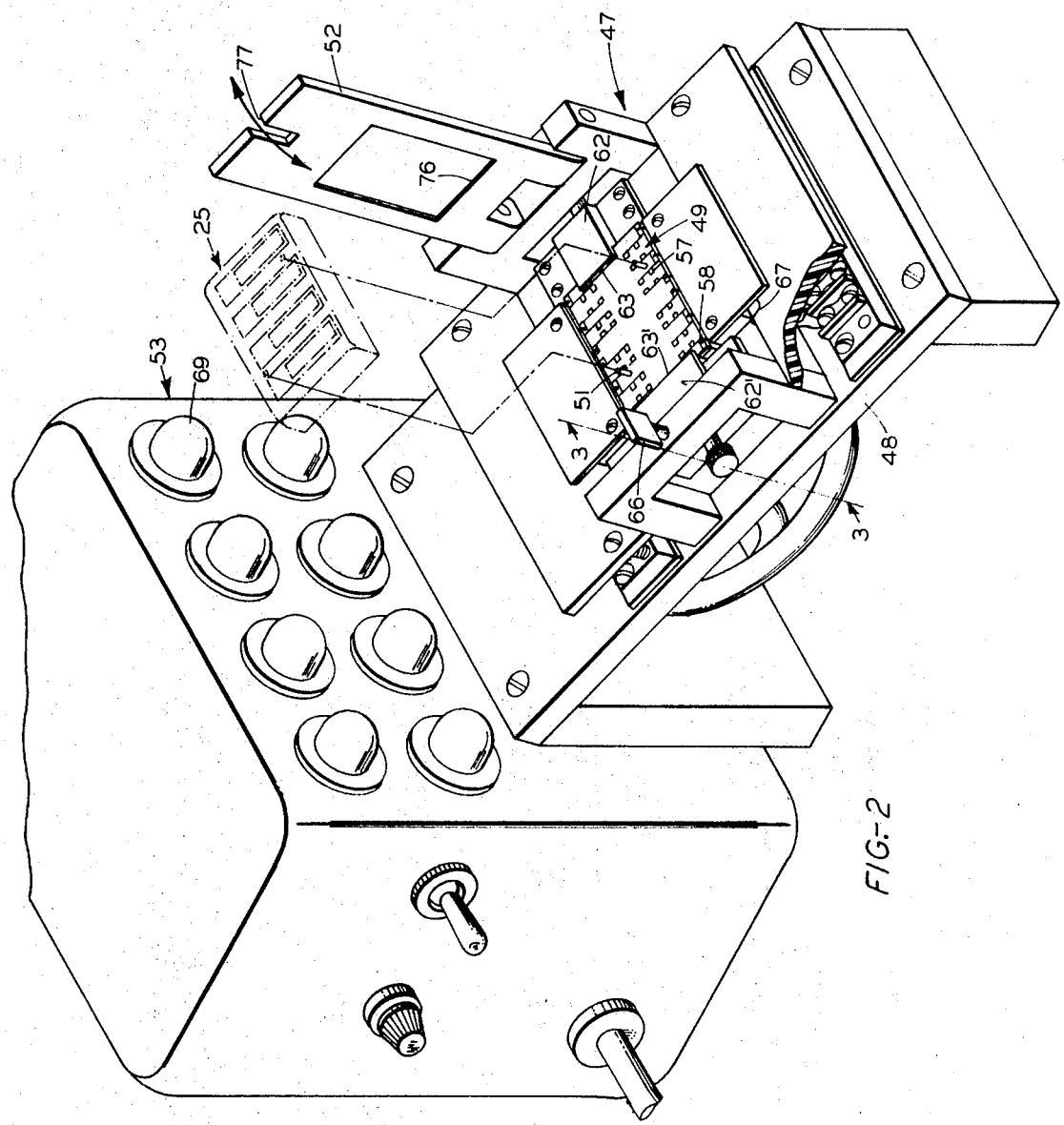
FIG. 2 is an isometric view, partially cut away, showing an apparatus for gaging slide switch-cover assemblies with an assembly to be gaged shown in the exploded position.

Referring now to FIG. 2, there is shown an apparatus 47 for gaging the slide switch-cover assembly 25, wherein the cover assembly is exploded away from the apparatus for clarity. The apparatus 47 includes a base 48, a contact pad assembly 49 with reference pins 51—51, a clamp 52 and an indicating unit 53.

The contact pad assembly 49 (refer to FIG. 4) includes a holder 54 to which an insulating substrate 56 is fixed. The substrate 56 serves as the foundation for an array of contact pads 57—57, terminations 58—58 and conductors 59—59 interconnecting the pads and terminations. The conductors, contact pads and terminations are formed on the insulating substrate 56 by thin-film techniques well known in the art. (See Berry, Hall and Harris "Thin Film Technology," D. Van Nostrand, Princeton, N.J.) For example in the preferred embodiment, the substrate 56 is first coated by sputtering with a thin-film of tantalum; then coated with a thin-film of titanium by evaporation; and finally coated with gold by evaporation to provide a good composite conductive film. Other combinations and materials can be substituted for the preferred embodiment to form the conductive film. For example, titanium may be evaporated for adhesion, then gold or copper for conductivity and, finally, a thin layer of chromium for wear to thereby form the composite conductive film.

After the insulating substrate 56 is coated with the desired metal layers, a sensitive photoresist material is applied and exposed to a negative of the contact pad-conductor-termination pattern. Upon development and fixing of the photoresist, the metal under the pattern is protected but the rest of the metal is not. When processed further by etching with suitable etchants, all metal but that which is in the form of the desired pattern is removed. (For more complete information concerning the generation of thin-film patterns, see for example, steps 1 and 2 as described under Prior Art I in the copending application of J. F. Schneck, Ser. No. 781,817, filed Dec. 6, 1968 and assigned to the same assignee.) Finally, removal of the protective photoresist provides a finished array of contact pads, conductors and terminations on the substrate 56. Because of the nature of this process, the size and location of the contact pads 57—57 (as well as the terminations 58—58 and the conductors 59—59) are extremely accurate.

In addition, the dimensions of the contact pads 57—57 are advantageously and intentionally made so that the pads are about one-fifth the area of the corresponding attenuator contact areas 30—30. (Typically, the dimensions of the pads 57—57 are about 0.030 of an inch by about 0.046 of an inch.) This assures that, if the contact points 42—42 of the slide switches 22—22 touch the smaller contact pads 57—57, they are certain to touch the larger contact areas 30—30 of the finished attenuator 21.

However, in order to accurately locate the cover assembly 25 over the contact pads 57—57, the reference pins 51—51 are required and must be precisely located with respect to the contact pad pattern. This is accomplished, as will be explained, by providing openings 61—61, in the insulating substrate 56, which are larger in diameter than the largest diameter of the reference pins 51—51. The substrate 56 is fixed to the holder 54 by an epoxy cement or the like and is located in roughly the correct position with respect to the edges of the holder. Then, using precision jig boring and grinding techniques well known in the art and working through the openings 61—61, precisely located holes are formed in the holder 54. Next, the reference pins 51—51 are forced into the holes. This yields an assembly in which the reference pins 51—51 have a precise location with respect to the contact pad pattern.

The base 48 (FIG. 2) is provided with plates 62 and 62' containing ledges 63 and 63', respectively. The cover assembly 25 is forced down against the top of the ledges 63 and 63' by the clamp 52 which is secured by a quarter turn clamp screw 66 (FIG. 3). The clamp 52 is pivotally mounted at one side to the base 48, and contains a rectangular opening 76 to clear the switch tops 32—32 when the clamp is closed. The contact pad assembly 49 is retained against the underside of the ledges 63 and 63' by a thumb screw 65. The thickness of the ledges 63 and 63' spaces the cover assembly 25 the proper distance from the contact pad assembly 49 so that the spring contacts 34 and 34' are properly deflected into their working position. One end of each of leads 67—67 is connected by soldering, bonding or the like to the terminations 58—58 and the other end is connected through a terminal board to an electrical indicator circuit contained within the indicating unit 53. The indicating unit 53 contains low-current indicating lamps 69—69 and a power supply 71 (FIG. 4).

THE INVENTION—OPERATION

Figure 4:
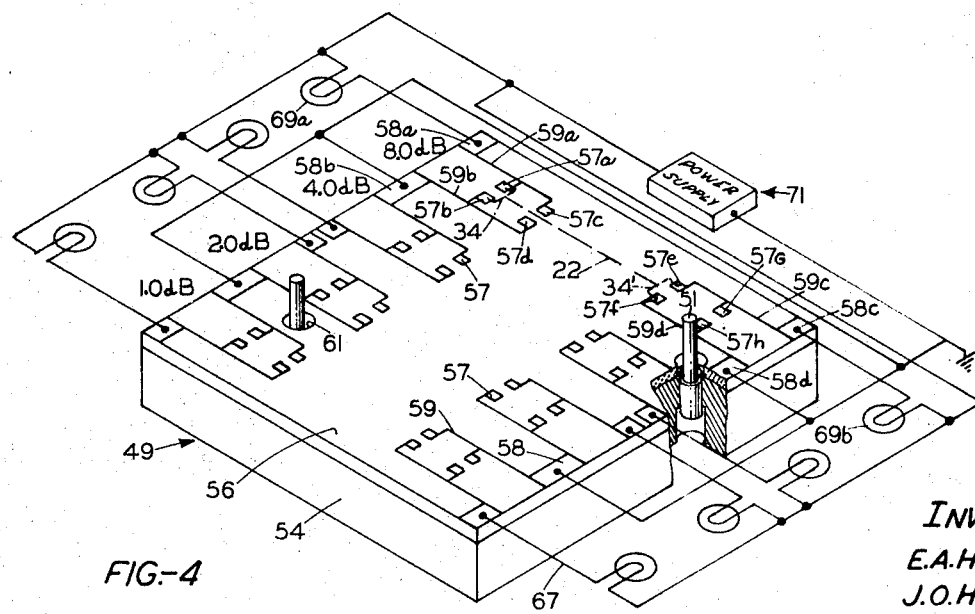
FIG. 4 is an isometric view, partially cut away, of a contact pad assembly for the gaging apparatus combined with an electrical schematic diagram.
Figure 3:
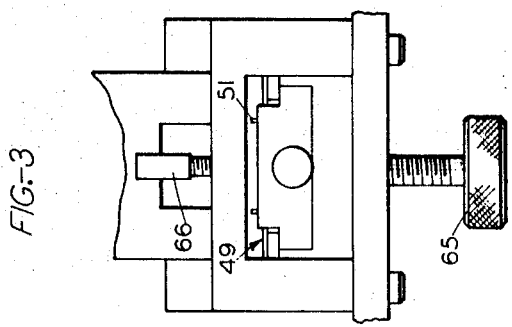
FIG. 3 is a partial end view along line 3—3 of the apparatus of FIG. 2.

Referring to FIGS. 2, 3 and 4, the clamp 52 is opened and a slide switch-cover assembly 25 is placed over the reference pins 51—51. The assembly 25 is then pushed firmly down so that the pins 51—51 enter the locating holes 31—31, the lower edge of the switch-cover assembly 25 is forced against the top of the ledges 63 and 63' and the contact points 42—42 bear against the contact pad assembly 49. Next, the clamp 52, which has the rectangular opening 76 to clear the switch tops 32—32, is closed and the clamp screw 66 is rotated a quarter-turn across a slot 77. Thus, the screw 66 cooperates with the clamp 52 to secure the cover assembly 25 firmly in place for gaging.

Now, assuming that the 8 db. switch 22 (FIG. 4) is in the left-hand position and that the contact points 42—42 of the spring contact 34 are within the predetermined desired limits, the spring contact 34 bridges contact pads 57a and b. The bridging of the contact pads 57a and b results in the lighting of lamp 69a thereby indicating that the contact points 42—42 are within such limits. The conducting path for the lamp 69a includes: the termination 58a, a conductor 59a, the contact pad 57a, the spring contact 34, the contact pad 57b, a conductor 59b, the termination 58b, the leads 67—67 and the power supply 71.

Likewise, if the contact points 42—42 of the spring contact 34' are within the desired limits, the lamp 69b also lights thereby indicating such condition. The conducting path for the lamp 69b includes: the termination 58c, a conductor 59c, the contact pad 57e, the spring contact 34' the contact pad 57f, the conductor 59d, the termination 58d, the leads 67—67 and the power supply 71.

On the other hand, if the contact points 42—42 of the switch 22 are not within the predetermined desired limits while the switch 22 is in the left-hand position, each lamp 69a and b, accordingly, indicates this condition by its failure to light.

Next, assume that the 8 db. slide switch 22 is placed in the right-hand position and that the contact points 42—42 are within the limits defined by the contacts pads 57—57. In this position the spring contact 34 bridges contact pads 57c and d while the spring contact 34' bridges contact pads 57g and h; thereby lighting lamps 69a and 69b, respectively, and indicating that the contact points 42 are within the defined limits. As shown in FIG. 4, lamps 69a and 69b are lit by the power supply 71 through the same conducting paths which energized the lamps for the left-hand position except that the paths include contact pads 57c, d, g and h instead of 57a, b, e and f.

Again, if the contact points 42—42 of the switch 22—22 are not within the limits defined by the contact pads 57c, d, g and h, each lamp 69a and b indicates such condition by failure to light.

In a similar manner, each of the other switches 22 may be tested and the appropriate lamps will indicate success or failure for each. The switches need not be tested in succession. All may be placed in the left-hand position and the lamps viewed for any failure and then all placed in the right-hand position and again examined for failure. The lamps immediately indicate which switches meet or fail to meet the limits defined by the contact pads 57—57 and in which position. Thus, the use of a precisely defined, accurately located array of contact pads on an insulating substrate obtained by thin-film techniques, reveals the accuracy of location of the contact points and achieves the objectives previously set forth.

What is claimed is:

1. An apparatus for determining whether moveable contact points, of a switch-cover assembly having a cover with locating holes, engage coacting thin-film conductive elements of an attenuator, which comprises:
   a. an insulating substrate having at least two apertures therein;
   b. an array of thin-film contact pads formed on the insulating substrate, each pad demarking the acceptable location of one of the contact points and having a size smaller than but proportional to that of the thin-film conductive elements of the attenuator and corresponding in position to the elements of the attenuator;
   c. reference pins having diameters less than those of the apertures and precisely located with respect to the contact pads and protruding upwardly through apertures in the insulating substrate for entering the locating holes in the cover and positioning the switch-cover assembly in a horizontal plane;
   d. means for spacing the contact points of the switch-cover assembly above the contact pads to deflect the contact points into a predetermined position and to electrically engage such contact points with such contact pads; and
   e. means connected to the contact pads for indicating electrical engagement of the contact points with the contact pads thereby determining whether the contact points engage the conductive elements.

2. The apparatus according to claim 1, wherein the contact pads have a size equal to approximately one-fifth the surface area of the conductive elements.

3. An apparatus for gaging the location of the moveable contact points of a switch-cover assembly, to determine whether the points will engage coacting conductive elements of an attenuator, having a cover with a pair of locating holes therein, which comprises:
   a. a holder;
   b. an insulating substrate supported by the holder and having at least a pair of apertures in the substrate;
   c. an array of thin-film contact pads, terminations and conductors interconnecting the pads and the terminations, each pad in the array being formed on the substrate for revealing the location of one of the contact points, the size and location of the contact pads defining predetermined desired limits of movement of the contact points, each pad being smaller than but proportional to a conductive element of the attenuator;
   d. reference pins fixed in the holder in relation to the array of contact pads on the substrate and protruding upwardly through the apertures in the substrates and into the holes in the cover for precisely locating the switch-cover assembly with respect to the contact pads;
   e. means connected to the holder for clamping the swtich-cover assembly against movement to position it with respect to the substrate to deflect the contact points into operating position; and
   f. means connected to the terminations and responsive to engagement of the contact points with the contact pads for indicating an electrical contact between such contact points and such contact pads.

4. An apparatus as recited in claim 3, wherein the thin-film contact pads, conductors and terminations comprise sequentially deposited layers of tantalum, titanium and of gold.

5. An apparatus as recited in claim 3, wherein the thin-film contact pads, conductors and terminations comprise sequentially deposited layers of titanium, gold and chromium.

6. An apparatus for determining whether moveable contact points, formed on contact springs of slide switches, engage coacting thin-film conductive elements of an attenuator upon the sliding of the slide switches into their end positions, the slide switches being slideably mounted in a switch-cover assembly having a cover with a pair of locating holes therein, which comprises:
   a. a base;
   b. a holder mounted on the base;
   c. an insulating substrate secured to the holder and having a pair of openings in the substrate;
   d. thin-film contact pads formed on the substrate, each pad being determinative of the engagement of one contact point and having a size smaller than but proportional to that of the thin-film conductive elements of the attenuator and corresponding in location to such elements of the attenuator;
   e. thin-film terminations formed on the substrate;
   f. thin-film conductors formed on the substrate for interconnecting the terminations and the contact pads;
   g. a pair of reference pins fixed in the holder in relation to the contact pads and protruding upwardly through the openings in the substrate to enter the locating holes in the cover, for precisely locating the switch-cover assembly with respect to the contact pads;
   h. means fastened to the base for spacing the switch-cover assembly a predetermined distance from the contact pads on the insulating substrate;
   i. clamping means pivotably mounted on the base and cooperating with the spacing means for retaining the switch-cover assembly against such spacing means to deflect the contact springs and pivot the contact points thereof against the contact pads and for permitting sliding of the slide switches into their end positions to engage the contact pads;
   j. means, mounted to the base and cooperating with the spacing means, for securing the insulating substrate against the spacing means; and
   k. means connected to terminations and responsive to the movement of the switches into their end positions for indicating whether the contact points electrically engage the contact pads.